United States Patent
Park et al.

(10) Patent No.: US 12,495,369 B2
(45) Date of Patent: Dec. 9, 2025

(54) METHOD AND APPARATUS FOR REPORTING EFFECTIVE POWER HEADROOM OF TERMINAL

(71) Applicant: Samsung Electronics Co., Ltd., Gyeonggi-do (KR)

(72) Inventors: Kyoungmin Park, Gyeonggi-do (KR); Ameha Tsegaye Abebe, Gyeonggi-do (KR); Seongmok Lim, Gyeonggi-do (KR); Youngrok Jang, Gyeonggi-do (KR); Hyoungju Ji, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 370 days.

(21) Appl. No.: 18/108,968

(22) Filed: Feb. 13, 2023

(65) Prior Publication Data

US 2023/0262614 A1    Aug. 17, 2023

(30) Foreign Application Priority Data

Feb. 15, 2022 (KR) .................. 10-2022-0019731

(51) Int. Cl.
*H04W 52/36* (2009.01)
*H04W 52/54* (2009.01)
*H04W 52/24* (2009.01)

(52) U.S. Cl.
CPC ....... *H04W 52/365* (2013.01); *H04W 52/367* (2013.01); *H04W 52/54* (2013.01); *H04W 52/242* (2013.01)

(58) Field of Classification Search
CPC . H04W 52/365; H04W 52/367; H04W 52/54; H04W 52/242; H04W 52/146; H04W 52/42; H04B 7/0404; H04B 7/0426
See application file for complete search history.

(56) References Cited

U.S. PATENT DOCUMENTS

| | | | | |
|---|---|---|---|---|
| 2016/0255594 A1* | 9/2016 | Vajapeyam | ......... | H04W 52/346 455/522 |
| 2022/0217654 A1* | 7/2022 | Kang | .................. | H04W 52/346 |
| 2023/0262614 A1* | 8/2023 | Park | .................... | H04W 52/365 455/522 |
| 2024/0155511 A1* | 5/2024 | Chung | .................. | H04W 52/36 |

FOREIGN PATENT DOCUMENTS

| WO | WO 2018/197930 | 11/2018 |
|---|---|---|
| WO | WO 2020/218900 | 10/2020 |
| WO | WO 2021/237457 | 12/2021 |
| WO | WO 2021/243674 | 12/2021 |

OTHER PUBLICATIONS

Motorola Mobility, Lenovo, "Power Control for Multi-panel UE", R1-1909157, 3GPP TSG RAN WG1 Meeting #98, Aug. 26-30, 2019, 4 pages.
International Search Report dated May 12, 2023 issued in counterpart application No. PCT/KR2023/002179, 9 pages.

* cited by examiner

*Primary Examiner* — Md K Talukder
(74) *Attorney, Agent, or Firm* — The Farrell Law Firm, P.C.

(57) ABSTRACT

The disclosure relates to a fifth generation (5G) or sixth generation (6G) communication system for supporting a higher data transmission rate. Disclosed is a method performed by a terminal in a communication system, including identifying a power headroom report (PHR), transmitting the PHR, and receiving uplink (UL) scheduling information related to the PHR, wherein the PHR is related to one power headroom value based on multiple panels of the terminal.

17 Claims, 11 Drawing Sheets

| | Type | Measurement panel | Measurement beam | PHR value |
|---|---|---|---|---|
| 401 PHR report 1 | virtual | Panel 1 | NB1 | -46dB |
| 402 PHR report 2 | virtual | Panel 1 | NB2 | -23dB |
| 403 PHR report 3 | virtual | Panel 2 | NB1 | -42dB |

Maximum UL rx power = 13dBm − 60dB = −47dBm
Virtual PHR = max power − 0.8 x pathloss = −46dB Maximum UL rx power = (−47dBm) + (23dBm − 66dB) = −41.5dBm
Possible enhancement in UL rx power = (−41.5dBm) − (−47dBm) = 5.5dB Effective PHR

- Case 1: effective PHR = enhancement on possible rx power = 5.5dB
- Case 2: effective PHR = virtual PHR + enhanced rx power = −40.5dB

UE tx power
* 13dBm on UB1
* No tx power onUB1'

PHR
* Real PHR as legacy = 0dB (PHR for UB1)
* Real PHR by proposal = 5.5dB (effective PHR)

TPC = 3dB

UE tx power
* Tx power of UB1' is set to 'x' dBm

UE calculates value of 'x' so gNb's rx power to be increase by 3dB
* x = 19dBm

METHOD AND APPARATUS FOR REPORTING EFFECTIVE POWER HEADROOM OF TERMINAL

CROSS-REFERENCE TO RELATED APPLICATION(S)

This application is based on and claims priority under 35 U.S.C. § 119 to Korean Patent Application No. 10-2022-0019731, filed on Feb. 15, 2022, in the Korean Intellectual Property Office, the disclosure of which is incorporated herein by reference in its entirety.

BACKGROUND

1. Field

The disclosure relates generally to wireless communications, and more particularly, to a method and an apparatus for reporting effective power headroom of a terminal in a wireless communication system.

2. Description of Related Art

Fifth generation (5G) mobile communication technologies define broad frequency bands such that high transmission rates and new services are possible, and can be implemented not only in Sub 6 gigahertz (GHz) bands such as 3.5 GHz, but also in Above 6 GHz bands referred to as millimeter wave (mmWave) bands including 28 GHz and 39 GHz. Efforts have also been made to implement sixth generation (6G) mobile communication technologies, (referred to as Beyond 5G systems, in terahertz (THz) bands such as 95 GHz to 3 THz bands, to achieve transmission rates fifty times faster than 5G mobile communication technologies and ultra-low latencies one-tenth of 5G.

In the initial state of 5G mobile communication technologies, in order to support services and to satisfy performance requirements in connection with enhanced mobile broadband, (eMBB), ultra-reliable & low latency communications (URLLC), and massive machine-type communications (mMTC), there has been ongoing standardization regarding beamforming and massive multiple input multiple output (MIMO) for alleviating radio-wave path loss and increasing radio-wave transmission distances in mmWave, operating multiple subcarrier spacings for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large-capacity data transmission and a polar code for highly reliable transmission of control information, L2 pre-processing, and network slicing for providing a dedicated network customized to a specific service.

Currently, there is ongoing discussion regarding improvement and performance enhancement of initial 5G mobile communication technologies in view of services to be supported by 5G mobile communication technologies, and there has been physical layer standardization regarding technologies such as vehicle to everything (V2X) for aiding driving determination by autonomous vehicles based on information regarding positions and states of vehicles transmitted by the vehicles and for enhancing user convenience, New radio unlicensed (NRU) aimed at system operations conforming to various regulation-related requirements in unlicensed bands, NR user equipment (UE) power saving, non-terrestrial network (NTN) which is UE-satellite direct communication for securing coverage in an area in which communication with terrestrial networks is impossible, and positioning.

Moreover, there has been ongoing standardization in wireless interface architecture/protocol fields regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access channel for new radio (2-step RACH for NR) as simplifying random access procedures. There also has been ongoing standardization in system architecture/service fields regarding a 5G service based architecture or service based interface for combining network functions virtualization (NFV) and software-defined networking (SDN) technologies, and mobile edge computing (MEC) for receiving services based on UE positions.

If such 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is active in connection with extended reality (XR) for efficiently supporting augmented reality (AR), virtual reality (VR), mixed reality (MR), 5G performance improvement and complexity reduction by utilizing artificial intelligence (AI) and machine learning (ML), AI service support, metaverse service support, and drone communication.

Such development of 5G mobile communication systems will serve as a basis for developing not only new waveforms for securing coverage in THz bands of 6G mobile communication technologies, full dimensional MIMO (FD-MIMO), multi-antenna transmission technologies such as array antennas and large-scale antennas, metamaterial-based lenses and antennas for improving coverage of THz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI \ from the design stage and internalizing end-to-end AI support functions, and next-generation distributed computing technology for implementing services at levels of complexity exceeding the limit of UE operation capability by utilizing ultra-high-performance communication and computing resources. Among them, a URLLC service that is under consideration in the 5G system in connection to the existing fourth generation (4G) system requires ultrahigh reliability, such as a packet error rate (PER) of about 10-5, and low latency of about 0.5 milliseconds (msec) conditions as compared to the other services. To meet these strict conditions, the URLLC service may need to apply a shorter transmission time interval (TTI) than an eMBB service, and various operating schemes employing the same are now under consideration.

As a common technique capable of satisfying the conflicting requirements of URLLC service requiring high reliability and eMBB service requiring a high transmission rate, the multi-transmission and reception point (M-TRP) in which a terminal performs communication through multiple transmission and reception nodes has been standardized through the third generation partnership project (3GPP) release 16 (Rel-16), and thereafter a method of applying the technology to various channels such as packet data control channel (PDCCH), physical downlink shared channel (PDSCH), physical uplink shared channel (PUSCH), and physical uplink control channel (PUCCH) through release 17 (Rel-17) has been proposed. The M-TRP technique is divided into single downlink control information (S-DCI) that controls transmission and reception through multiple nodes based on one piece of control information, and multiple downlink control information (M-DCI) that separately transmits information about each node. The S-DCI technique is suitable for implementation in a network having a relatively simple structure in which only one node among multiple nodes performs terminal control, and for use in a base station and a cell responsible for communication in a small area. The M-DCI technique is used when multiple nodes perform terminal control and is expected to mainly apply to a network that provides communication in a relatively wide area and has a long distance between nodes.

As a terminal communication technique corresponding to the M-TRP, standardization of the multi-panel-based communication technique has partially progressed, and additional standardization is expected to proceed in the future. The multi-panel-based communication technique is where a terminal performs communication through multiple antenna arrays which can operate independently, and the total transmit power can be increased through independent operation and cooperative operation between each array, or communication through a beam with good quality is enabled.

As the prior art is deficient in providing a base station configuration for generating an optimized power control command and for maximizing power control in a terminal, however, a method and apparatus for achieving the same is necessary in the art.

SUMMARY

This disclosure is provided to address at least the above-mentioned problems and/or disadvantages and to provide at least the advantages described below.

Accordingly, an aspect of the disclosure is to provide a signal and information reporting technique in relation to controlling of the operation of a terminal configured to communicate with a base station by using multiple panels, such that when the terminal randomly determines the number of panels to be used for uplink communication and performs or desires to perform uplink transmission through simultaneous use of multiple panels, the terminal reports related information to the base station to enable the base station to control or schedule uplink communication in consideration of the multi-panel operation of the terminal.

In accordance with an aspect of the disclosure, a method performed by a terminal in a communication system includes identifying a power headroom report (PHR), transmitting the PHR, and receiving uplink (UL) scheduling information related to the PHR, wherein the PHR is related to one power headroom value based on multiple panels of the terminal.

In accordance with an aspect of the disclosure, a terminal configured to operate in a communication system includes a transceiver, and a controller coupled with the transceiver, wherein the controller is configured to identify a PHR, transmit the PHR, and receive UL scheduling information related to the PHR, and wherein the PHR is related to one power headroom value based on multiple panels of the terminal.

According to an embodiment, a method performed by a base station in a communication system includes receiving a PHR, and transmitting UL scheduling information related to the PHR, wherein the PHR is related to one power headroom value based on multiple panels of a terminal.

According to an embodiment, a base station configured to operate in a communication system includes a transceiver, and a controller coupled with the transceiver, wherein the controller is configured to receive a PHR, and transmit UL scheduling information related to the PHR, and wherein the PHR is related to one power headroom value based on multiple panels of a terminal.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, embodiments of the disclosure will be described in detail with reference to the accompanying drawings.

In describing embodiments of the disclosure, descriptions related to technical contents well-known in the art and not associated directly with the disclosure will be omitted for the sake of clarity and conciseness.

In addition, in the accompanying drawings, some elements may be exaggerated, omitted, or schematically illustrated, and the size of each element does not completely reflect the actual size. In the drawings, identical or corresponding elements are provided with identical reference numerals.

The advantages and features of the disclosure and manners to achieve them will be apparent by making reference to embodiments as described below in detail in conjunction with the accompanying drawings. However, the disclosure is not limited to the embodiments set forth below and may be implemented in various different forms. The following embodiments are provided to inform those skilled in the art of the scope of the disclosure. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, a unit refers to a software element or a hardware element, such as a field programmable gate array (FPGA) or an application specific integrated circuit (ASIC), which performs a predetermined function. However, the unit does not always have a meaning limited to software or hardware. The unit may be constructed either to be stored in an addressable storage medium or to execute one or more processors. Therefore, the unit includes software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the unit may be combined into a fewer number of elements or a unit, or divided into a larger number of elements or a unit. The elements and units or may be implemented to reproduce one or more central processing units (CPUs) within a device or a security multimedia card.

Particular terms as used in the following description are present to provide an understanding of the disclosure, and the use of these particular terms may be changed in different formats without departing from the technical idea of the disclosure.

The disclosure provides a method for reporting information required for communication by a terminal to a base station in a wireless communication system.

A terminal as disclosed herein may be configured to, in reporting information on UL transmission through the use of multiple panels to the base station, collect information on the communication environment of each of the multiple panels and perform information reporting through one representative value representing the collected information.

A base station as disclosed herein may be configured to generate a power control command for a combination of all panels rather than for each panel, based on information on the power headroom of multiple panels reported by a terminal, and transfer the generated power control command to the terminal.

A terminal as disclosed herein may be configured to apply, for performing an operation based on a UL power control command of a base station, the UL power control command equally or differently to transmit power control of each panel. For example, if the base station instructs the terminal about transmit power reduction, the terminal may reduce the transmit power of all or a part of the panels used for UL transmission.

A terminal as disclosed herein may be configured to obtain one effective power headroom value by calculating power headroom for each panel and collecting the power headroom for each panel, and report the obtained effective power headroom value to the base station.

In controlling uplink (UL) communication based on the existing standard, a base station may be configured to select a downlink (DL) beam first according to information about downlink (DL) channel/link quality reported by a terminal, such as a DL signal to noise ratio (SNR)/signal to interference plus noise ratio (SINR), and select the same beam as a UL beam depending on circumstances. Alternatively, after indicating transmission of a UL reference signal (RS) for UL SNR/SINR measurement according to circumstances, the base station may select a UL beam based on the measurement value.

The base station may configure a beam specific power control setting for each of candidate beams applicable to the UL and, if a UL beam is indicated, the terminal may perform UL transmission based on the related power control setting. The terminal may report power headroom to the base station in a virtual power headroom report (PHR) or real PHR before or after UL transmission, and the base station may perform UL scheduling to each terminal based on the channel/link quality information and the power headroom information of the terminal.

As an improved method introduced in Rel-17, if the terminal has limited UL transmit power for a specific direction or beam, the terminal may report this limitation to the base station in a beam specific PHR, and the base station may perform UL beam selection and UL scheduling by considering the power limitation.

Figure 1:
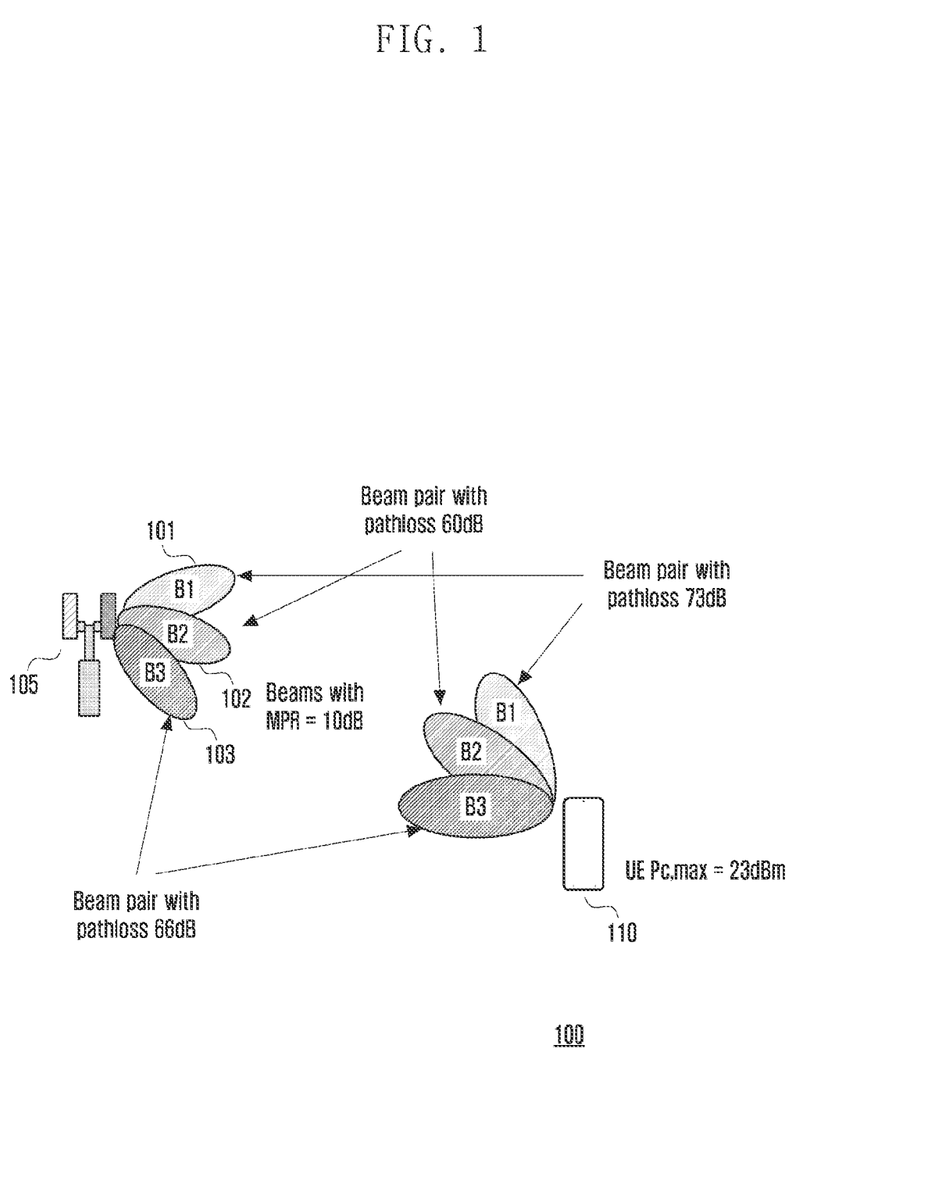
FIG. 1 illustrates when UL transmit power of a terminal is restricted with respect to a specific beam, according to an embodiment.

FIG. 1 illustrates when UL transmit power of a terminal is restricted with respect to a specific beam 100, according to an embodiment.

In FIGS. 1, B1 101, B2 102 and B3 103 may be candidate beams usable for UL transmission. B2 102 is capable of supporting the smallest pathloss, such as when pathloss=60 decibels (60 dB) among the candidate beams and is recognized as the best beam, and B1 may incur the largest pathloss, such as when pathloss=73 dB to be recognized as the least efficient beam among the candidate beams. As a characteristic of an array antenna, during beam generation, an array antenna may generate a beam with high gain in a specific direction and in a nearby direction, but the beam gain is reduced during beam generation with respect to the other directions. Due to this characteristic, in FIG. 1, if B2 102 has the highest gain, beams B1 101 and B3 103 developing in divergent directions from B2 102 are likely to have lower gain than B2 102. Since the pathloss defined in NR is a measurement value including beamforming gain, the pathloss measured through beams B1 101 and B3 103 is likely to be larger than the pathloss measured through beam B2 102.

In the above example, if beam-specific MPE or directional MPE occurs with respect to B2 102 and B3 103, the terminal 110 may not need to perform high data rate transmission during UL transmission. Therefore, even if the UL received power has a value of −47 decibel milliwatts (dBm) (i.e., Pc,max−MPE−B3_pathloss=−47 dBm) or less, the base station 105 may schedule UL transmission through B3 103 to the terminal 110, and base station 105 may schedule the terminal 110 to perform transmission using power of 13 dBm (i.e., Px,max−MPE=13 dBm) or less.

If the base station 105 requires UL received power of −47 dBm or more, UL transmission through B3 may not be scheduled to the terminal 110.

If the terminal 110 has multiple panels, the terminal 110 may generate beams with high gain with respect to more diverse directions.

Figure 2:
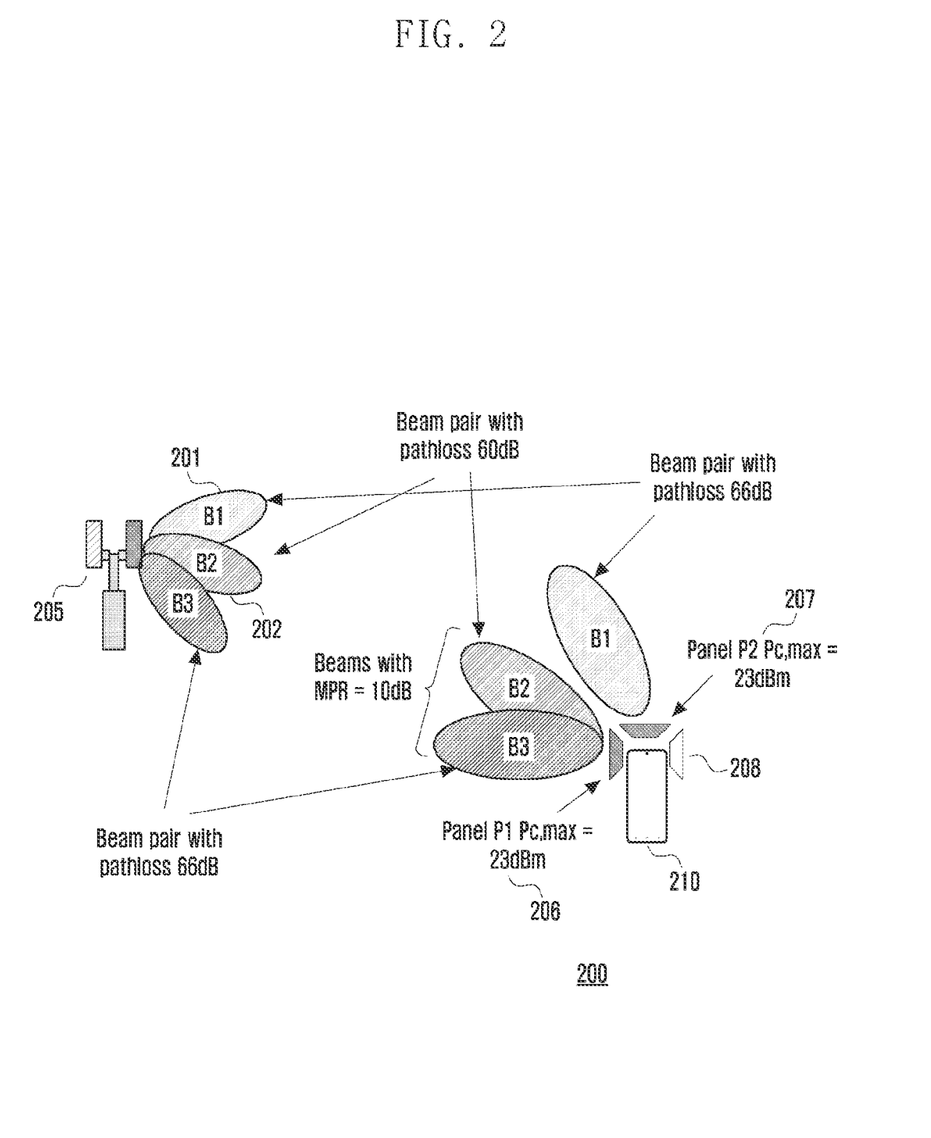
FIG. 2 illustrates when maximum permissible exposure (MPE) occurs in a terminal having multiple panels, according to an embodiment.

FIG. 2 illustrates when MPE occurs in a terminal having multiple panels 200, according to an embodiment.

In FIG. 2, a terminal 210 includes three panels (206, 207, 208) and UL candidate beams are allocated to two panels (206, 207) among them. The panel 208 may be non-functional with respect to the UL candidate beams since the panel 208 does not face the UL candidate beams. FIG. 2 illustrates when B1 201 is generated by another panel, and in which the gain of B1 201 increases and the pathloss thereof decreases compared to the case of FIG. 1. In this case, the base station 205 may select different beams through UL scheduling according to transmit power required for UL transmission.

As an example, if the terminal 210 does not need to perform high data rate transmission during UL transmission, and even if the UL received power has a value of −47 dBm (i.e., Pc,max−MPE−B2 pathloss=−47 dBm) or less, the base station 205 may schedule UL transmission through B2 202 to the terminal 210 and may schedule the terminal 210 to perform transmission using power of 13 dBm (i.e., Px,max−MPE=13 dBm) or less.

When the UL received power of the base station 205 needs to be −47 dBm or more and thus the UL transmission through B2 202 cannot satisfy the required performance, the base station 205 may schedule, for the terminal 210, UL transmission using B1 201 capable of providing the highest reception power. In this case, the base station 205 may schedule UL transmission requiring up to −40 dBm of UL received power to the terminal 210. However, since the UL transmission signal is transmitted to the base station 205 through a higher pathloss, the power efficiency of the terminal 210 may be reduced.

When a terminal 210 may be available to perform simultaneous transmission for a single beam of a base station 205 by using multiple panels, for example, in case that the base station 205 uses a fixed beam such as a sector beam or uses a wide beam, the terminal 210 may support better UL performance by simultaneously using multiple panels instead of selecting one panel to be used for UL transmission.

Figure 3:
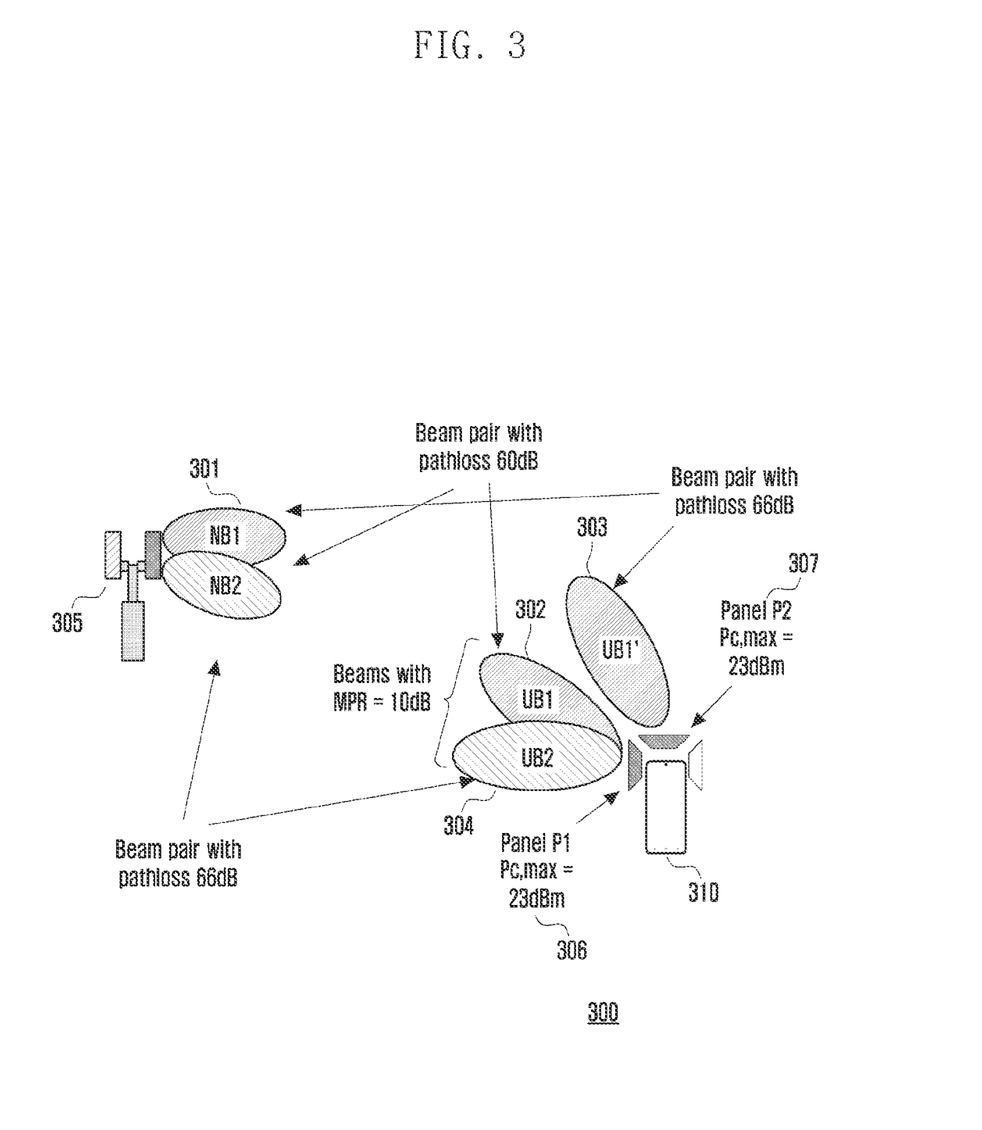
FIG. 3 illustrates when a terminal performs simultaneous UL transmission by using multiple panels, according to an embodiment.

FIG. 3 illustrates when a terminal performs simultaneous UL transmission using multiple panels 300, according to an embodiment.

In FIG. 3, if the terminal 310 uses both panels P1 306 and P2 307 and performs simultaneous UL transmission through the use of beams UB1 302 and UB1' 303, the terminal 310 may output a signal of 13 dBm through a link having 60 dB pathloss and output a signal of 23 dBm through a link having 66 dB pathloss. In case that the two transmissions correspond to transmission of the same signal and information, the base station 305 may simultaneously receive the two transmissions through beam NB1 301 so as to secure a received power of −41.5 dBm (i.e., (−47 dBm)+(−43 dBm)=−41.5 dBm). That is, the base station 305 may secure a received power of −41.5 dBm by using both the link between NB1 301 and UB1 302 corresponding to a received power of −47 dBm and the link between NB1 301 and UB1' 303 corresponding to a received power of −43 dBm. That is, the base station 305 may secure about 5.5 dB higher received power compared to when the terminal 310 communicates using only P1 306, and the base station 305 may secure about 1.5 dB higher received power compared to when the terminal 310 uses only P2 307.

As a method in which the terminal 310 reports the above situation to the base station 305 and the base station 305 performs UL scheduling by considering the situation, a method of performing panel specific reporting may have been considered. For example, as a method for reporting the situation of FIG. 3 to the base station 305 by the terminal 310, the terminal 310 may report the link quality (SNR/SINR) when the terminal 310 uses beams UB1 302 and UB2 304 with respect to the P1 306 panel to the base station 305, and may also report the PHR in the corresponding situation.

Figure 4:
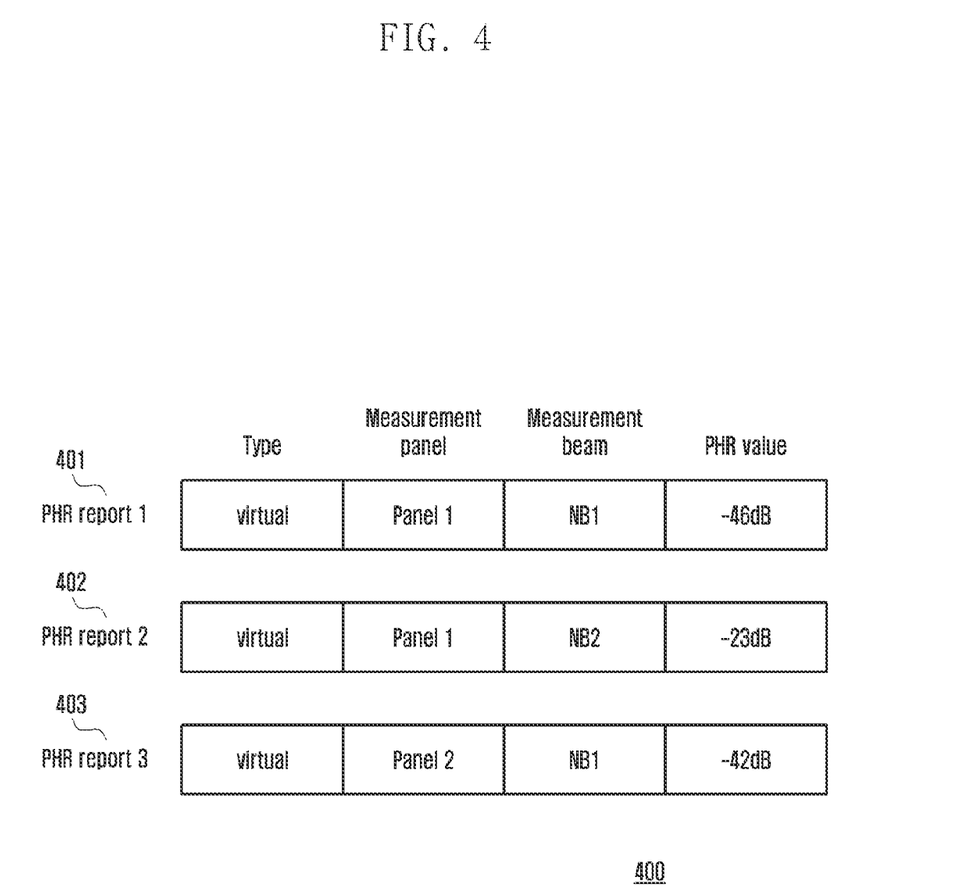
FIG. 4 illustrates a method in which a terminal reports a PHR for each beam and per panel, according to an embodiment.

FIG. 4 illustrates a method in which a terminal reports a PHR for each beam and per panel 400, according to an embodiment.

In FIG. 4, when the terminal reports the virtual PHR, and Equation (1) below is used by the terminal, $$PH_{type1,b,f,c}(i,j,q_d,l) = \tilde{P}_{CMAX,f,c}(i) - \{P_{O\_PUSCH,b,f,c}(j) + \alpha_{b,f,c}(j) \cdot PL_{b,f,c}(q_d) + f_{b,f,c}(i,l)\} \quad (1)$$

where $\tilde{P}_{CMAX,f,c}$ maximum transmit power of panel, it is assumed that:

$P_{O\_PUSCH,b,f,c} = 0$ dB $\alpha_{b,f,c} = 0.8$, and $f_{b,f,c} = 0$.

The report in FIG. 4 is configured to identify the operation performance for each panel of the terminal by the base station, and may be used to support the operation of directly controlling the panel use of the terminal by the base station. If the base station directly controls the panel use of the terminal, the terminal needs to additionally perform various reporting to the base station about the performance for each panel. However, since there may be a difference between a panel use method desired by the terminal and a panel use method desired by the base station, the terminal may not support reporting detailed information about the panel. For example, if the PHR is reported as shown in PHR report 1 401, PHR report 2 402 or PHR report 3 403 in FIG. 4, the base station may select to use panel 2 as in PHR report 3 403 which is advantageous for obtaining sufficient received power or link performance in UL. Alternatively, the terminal may prefer to use panel 1 as in PHR report 1 401 or PHR report 2 402 only when high power UL transmission is not required. The terminal may autonomously omit a report on panel 2 to induce use of panel 1, and accordingly, UL scheduling of the base station may be restricted.

The disclosure may support simultaneous use of multiple panels of a terminal without multiple PHR reports per panel of the terminal, other reports per panel, and direct control of a terminal panel by a base station as described above. In addition, the disclosure provides a more simplified PHR reporting technique that allows a base station to perform UL scheduling suitable for the simultaneous use of multiple panels of a terminal.

According to an embodiment, a terminal may determine by itself simultaneous UL transmission of multiple panels through additional use of a new panel by considering channel and link conditions. If the terminal determines the above operation, the terminal may not separately report information on UL performance supportable by each panel to the base station, with respect to each panel performing the simultaneous transmission. Alternatively, since the terminal simultaneously uses multiple panels according to the above determination, the terminal may report, to the base station, information on enhancement in UL performance which may occur compared to when the single panel is used.

In more detail, the terminal may obtain and report an effective PHR when reporting the power headroom to the base station. The effective PHR may be a variable representing, in the form of PHR, a change in the magnitude of maximum received power which the base station can receive compared to before the UL transmission scheme is modified.

Figure 5:
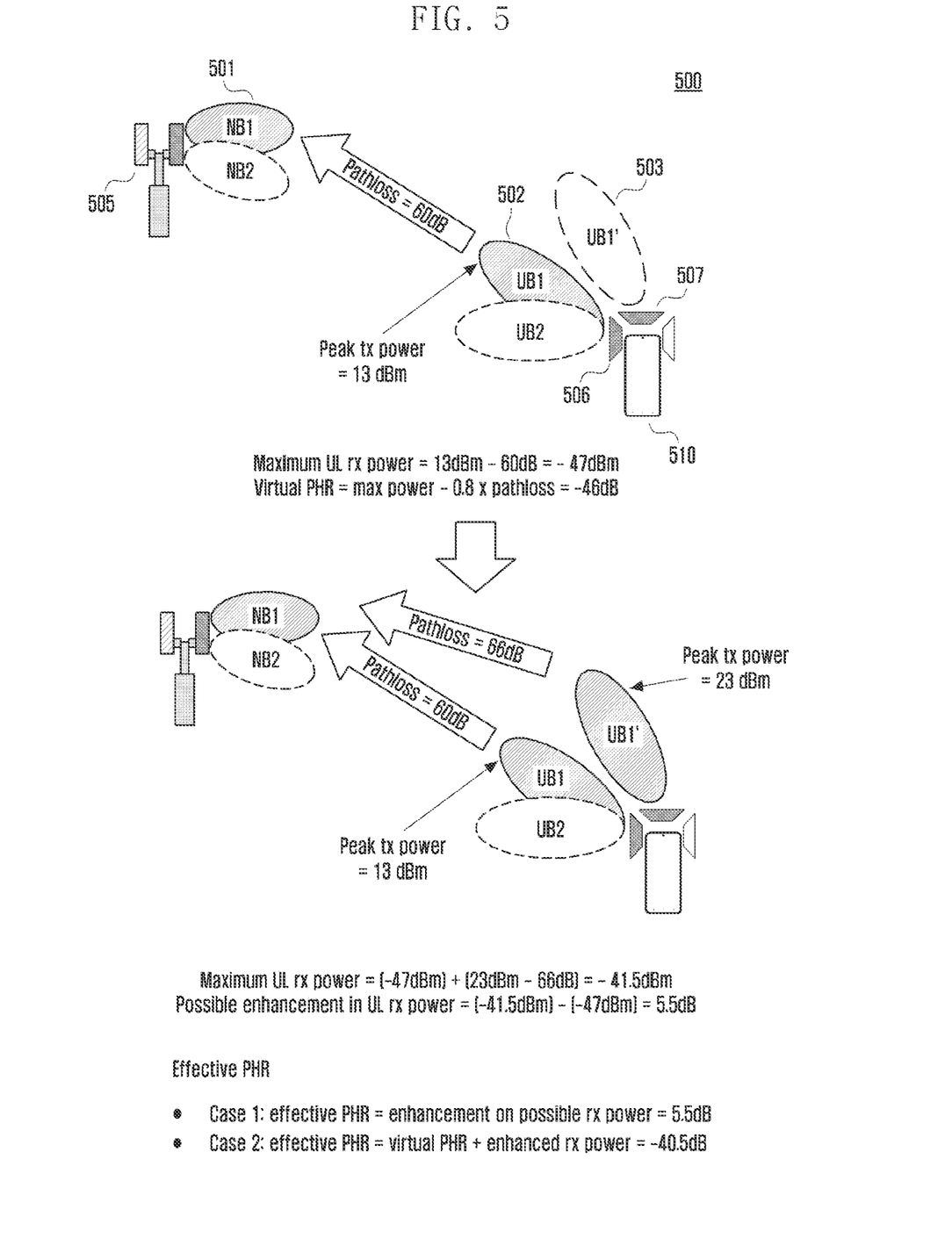
FIG. 5 illustrates when a terminal performs reporting of an effective PHR in a virtual PHR format, according to an embodiment.

FIG. 5 illustrates when a terminal performs reporting of an effective PHR in a virtual PHR format 500, according to an embodiment.

Referring to FIG. 5, a method of calculating and reporting an effective PHR if a terminal 510 performing UL transmission using a single panel 506 with respect to when the terminal 510 reports a virtual PHR switches to performing UL transmission using two panels 506, 507 is shown.

When a base station 505 performs UL communication using NB1 501 beam and the terminal 510 communicates using UB1 502 or two beams of UB1 502 and UB1' 503 is assumed. If the terminal 510 performs UL transmission using only UB1 502, the terminal 510 may use a transmit power of up to 13 dBm and the pathloss is −60 dB. Therefore, the UL received power has a maximum power of −47 dBm. However, if the terminal 510 performs simultaneous UL transmission using two beams UB1 502 and UB1' 503 and two panels 506, 507, the maximum UL received power of a signal received by the base station 505 through NB1 501 is −41.5 dBm, which is obtained by summing the UL received power of −47 dBm obtained through the use of UB1 502 beam of the terminal 510 and the UL received power of −43 dBm obtained through the use of the UB1' 503 beam of the terminal 510. That is, the base station 505 may secure a received power of −41.5 dBm by using both the link between NB1 501 and UB1 502 corresponding to a received power of −47 dBm and the link between NB1 501 and UB1' 503 corresponding to a received power of −43 dBm. That is, an increase of 5.5 dB in the UL received power may occur compared to when the terminal 510 uses a single panel 506 and single beam UB1 502. The UL received power increment expressed in a PHR format may be referred to as effective PHR, and the corresponding value reported to the base station 505 in a PHR reporting format may be referred to as effective PHR reporting.

As shown in FIG. 5, there are two methods of reporting an effective PHR with respect to a virtual PHR. One of the two methods corresponds to case 1 of FIG. 5 and is a method of reporting an increment in UL received power of the base station 505 according to simultaneous use of multiple panels 506 and 507. The other method corresponds to case 2 of FIG. 5 and is a method of reporting a PHR value by considering the increment in the virtual PHR. If the effective PHR is reported using the case 2 method, the base station 505 does not need to distinguish whether the PHR is an effective PHR, and may perform UL scheduling by assuming the value as a virtual PHR. If the terminal 510 reports the effective PHR using the case 1 method, the base station 505 performs UL scheduling by considering both the reported value and the virtual PHR.

The base station 505 may configure the terminal 510 to perform one of the method according to case 1 and the method according to case 2, and the terminal 510 may operate according to the configuration.

Figure 6:
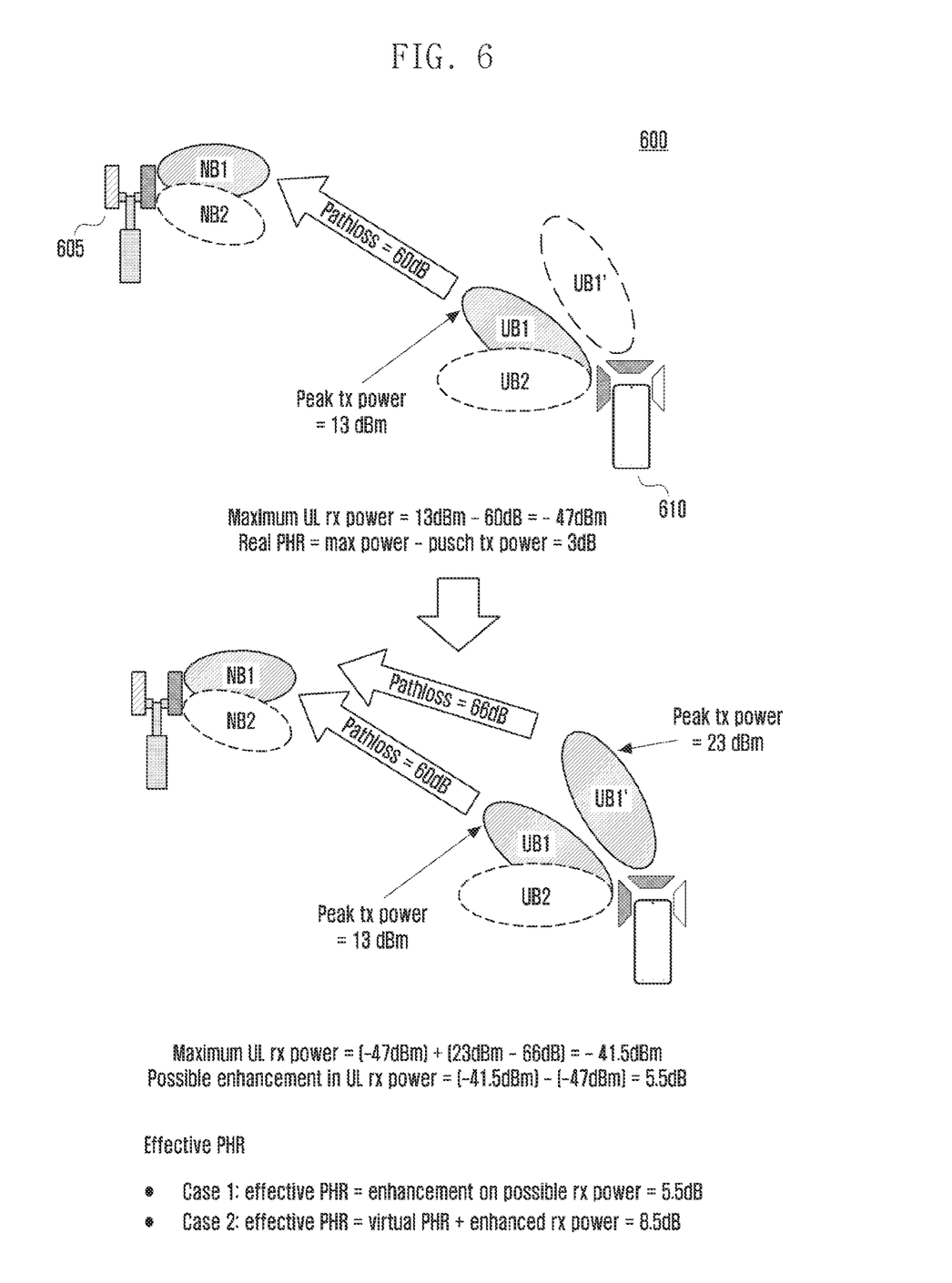
FIG. 6 illustrates when a terminal performs reporting of effective PHR in a real PHR format, according to an embodiment.

FIG. 6 illustrates when a terminal performs reporting of effective PHR in a real PHR format 600, according to an embodiment.

FIG. 6 illustrates another case in which the terminal 610 reports an effective PHR, and assumes when the terminal 610 performs beam and panel changes in the same manner as shown in FIG. 5 and reports a real PHR in an environment where the terminal 610 uses a PUSCH transmit power of 10 dBm. As in the case of FIG. 5, the terminal 610 may report the increased UL received power of 5.5 dB to the base station 605 in the form of an effective PHR (in case 1), or may report the effective PHR of 8.5 dB considering the increment (effective PHR=existing PHR+increased received power=8.5 dB) (in case 2). In addition, if the terminal 610 calculates the effective PHR through the case 2 method, the terminal 610 may report the effective PHR in the same manner as that of the real PHR without notifying the base station 605 that the calculated the effective PHR value corresponds to the effective PHR. In this case, the base station 605 may perform UL scheduling assuming that the effective PHR value is a real PHR. As in the case of FIG. 5, the base station 605 may configure the terminal 610 to perform one of the method according to case 1 and the method according to case 2, and the terminal 610 may operate according to the configuration.

Figure 7:
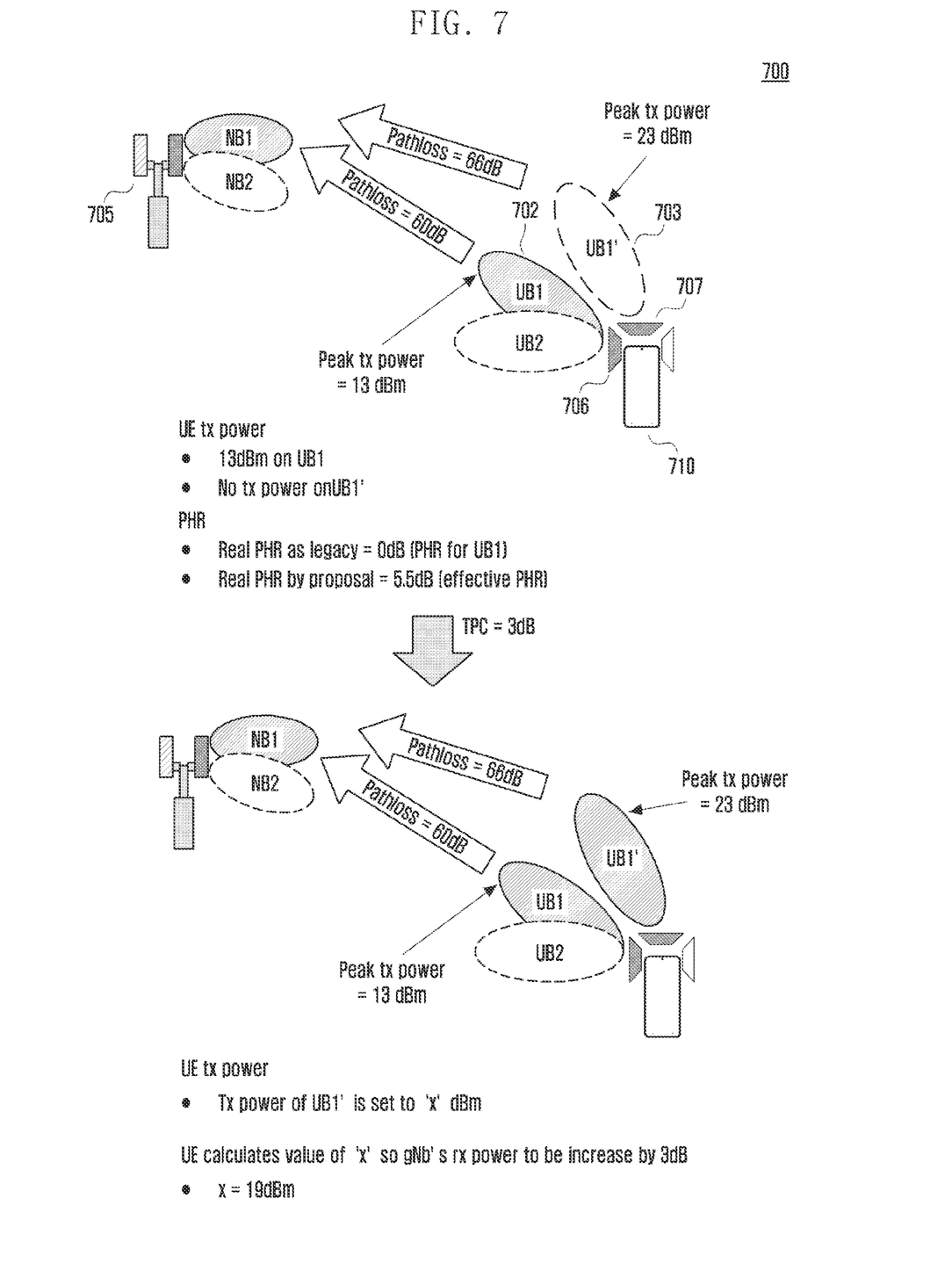
FIG. 7 illustrates a UL scheduling method based on an effective PHR recognized as a real PHR, according to an embodiment.

FIG. 7 illustrates a UL scheduling method based on an effective PHR recognized as a real PHR 700, according to an embodiment.

Referring to FIG. 7, a terminal 710 may report the effective PHR to a base station 705 through the case 2 method described in the section related to FIG. 6 above. In addition, the base station 705 may recognize the effective PHR as a real PHR and perform UL scheduling of the base station 705 and control transmit power of the terminal 710. In order to support maximum performance if the terminal 710 performs UL transmission using only one panel 706, it is assumed that the terminal 710 uses 13 dBm, which is the maximum transmit power through UB1 702. In order to perform UL transmission at a higher data rate, the terminal 710 may determine simultaneous use of two panels 706 and 707, measure the effective PHR, and report the PHR value measured using the effective PHR method to the base station 705 as a real PHR. In the above example, the terminal 710 may report 8.5 dB of a real PHR (real PHR=8.5 dB).

Due to the report of the new PHR value, the base station 705 may recognize that the terminal 710 has a lot of power headroom left, and the base station 705 may perform UL scheduling so that the terminal 710 increases the transmit power by 3 dB to perform UL transmission at a higher data rate. The base station 705 may request the terminal 710 to increase the transmit power by 3 dB in a situation even though the base station 705 does not accurately recognize that the terminal 710 is using multiple panels 706 and 707. In addition, the terminal 710 may understand the request as the request of a 3 dB increase in the UL received power of the base station 705 rather than the 3 dB increase in the transmit power of the terminal 710, and calculate the UL transmit power of UB 1' 703 required to further increase the UL received power of the base station 705 by 3 dB. The transmit power of UB1' 703 required in the above example is 19 dBm. That is, the terminal 710 may configure the transmit power of UB 1' 703 to be 19 dBm so as to solve a command of increasing 3 dB in the UL transmit power of the base station 705.

Figure 8:
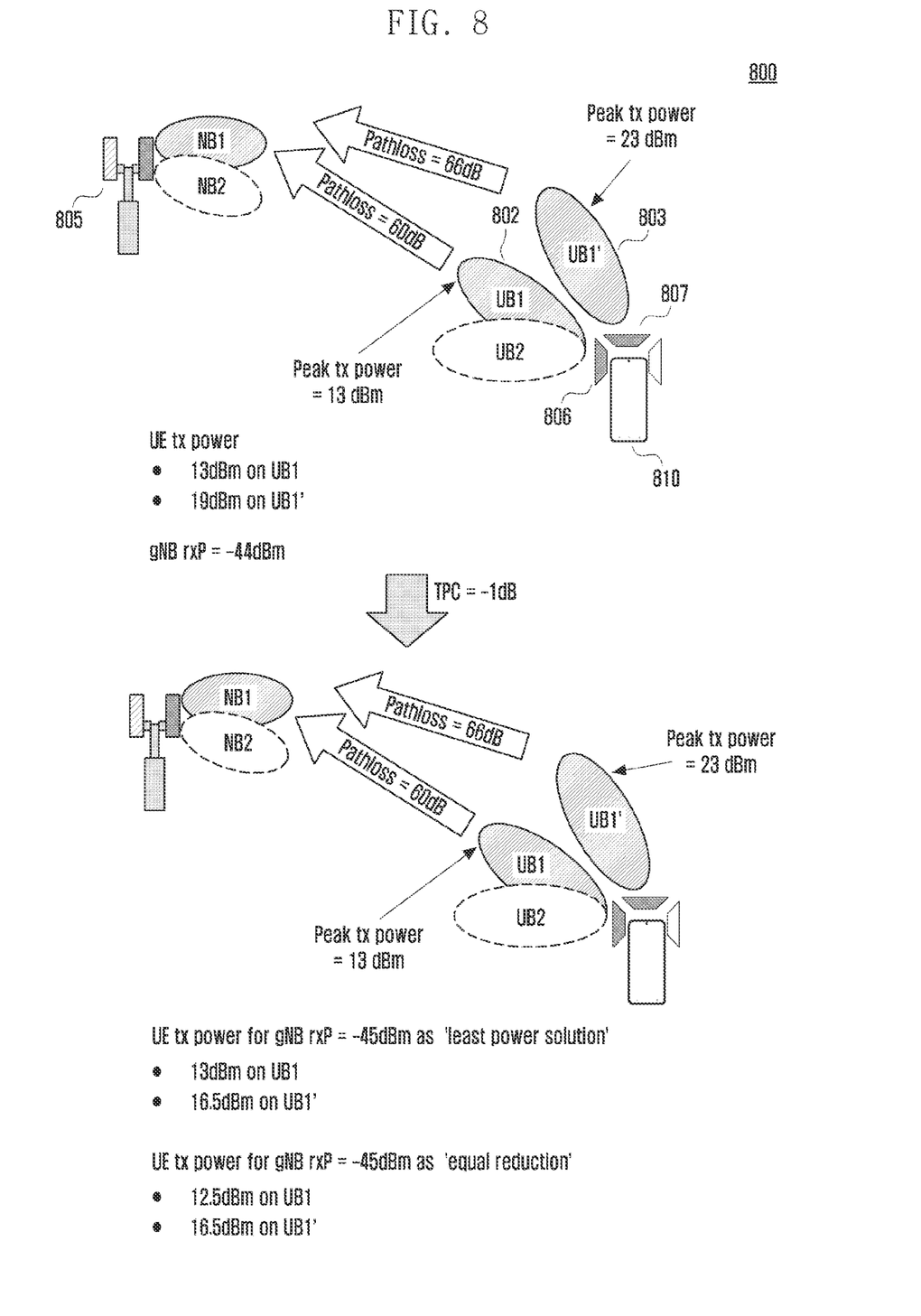
FIG. 8 illustrates a UL scheduling method based on an effective PHR recognized as a real PHR, according to an embodiment.

FIG. 8 illustrates a UL scheduling method based on an effective PHR recognized as a real PHR 800, according to an embodiment.

In FIG. 8, the UL scheduling method is based on an effective PHR recognized as a real PHR, and a terminal operation when a base station transmits a command of reducing transmit power to the terminal 810 is shown. When two panels 806 and 807 of the terminal 810 perform UL transmission using 13 dBm and 19 dBm transmit power, respectively, through UB1 802 and UB1' 803 through the process illustrated in FIG. 7, if the base station 805 transmits a command of power reduction by 1 dB to the terminal 810, the terminal 810 may execute the command in various methods. In case that the terminal 810 wants to minimize the transmit power, the terminal 810 may use a method of reducing the transmit power of UB1' having a larger pathloss and reducing the UL received power of the base station 805 by 1 dB. In this case, as illustrated in FIG. 8, the terminal 810 may reduce the transmit power of UB1' by 2.5 dB. Alternatively, if the terminal 810 wants to equally reduce the transmit power of two panels 806 and 807 or two beams UB1 802 and UB1' 803, a method of equally reducing the transmit power of each panel or each beam by 0.5 dB may also be used. That is, the detailed contents of executing the power control command of the base station 805 may differ according to a method in which terminal 810 wants to manage each panel or total transmit power. In other words, the terminal 810 may autonomously determine a specific utilization method relating to use of the panel for UL transmission.

Figure 9:
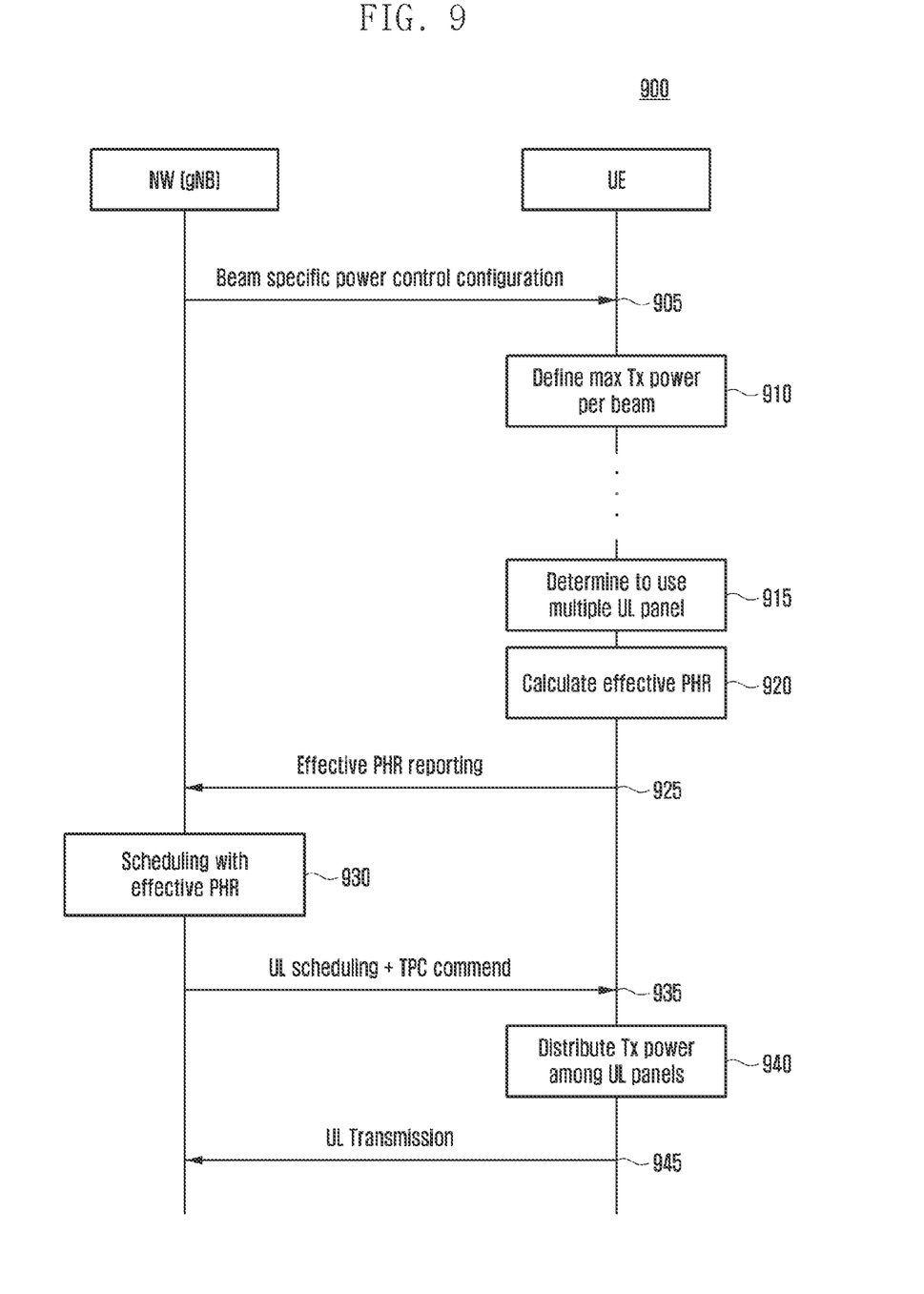
FIG. 9 is a flowchart of a method for PHR reporting of a terminal and UL scheduling of a base station, according to an embodiment.

FIG. 9 is a flowchart of a method for PHR reporting of a terminal and UL scheduling of a base station 900, according to an embodiment.

Referring to FIG. 9, the terminal may report one PHR with respect to multiple panels instead of reporting a PHR per panel. Measurement of the PHR is performed according to the effective PHR concept disclosed herein, but reporting of the PHR may be performed in the form of an existing virtual PHR or real PHR, and reporting in a separate effective PHR format is also possible.

If the terminal reports a single PHR, the base station may perform UL scheduling by considering the report. The terminal may determine maximum transmit power per beam for each panel to satisfy the UL received power required by the scheduling.

Based on the determination of the terminal, the terminal may perform UL simultaneous transmission through multiple panels.

To this end, in step 905, a base station (gNB or network (NW)) may transmit a beam specific power control configuration to the terminal. In step 910, the terminal may determine maximum transmission (Tx) power for each beam. In step 915, the terminal may determine whether to use multiple UL panels.

In step 920, when determining to use multiple UL panels, the terminal may calculate an effective PHR and, in step 925, may transmit the effective PHR to the base station. The effective PHR may be performed in the form of an existing virtual PHR or real PHR, and reporting in a separate effective PHR format is also possible. The base station may configure, for the terminal, the form or type of PHR to be reported by the terminal. For example, while configuring for the terminal to perform PHR reporting, the base station may configure, for the terminal, whether to report the effective PHR, report the PHR for each panel of the terminal, or report the existing PHR, and the terminal may operate to report the configured PHR.

In step 930, the base station may determine UL scheduling information based on the received effective PHR. In step 935, the base station may transmit the UL scheduling information and the transmit power control (TPC) command to the terminal. The TPC command may be used for the total transmit power for all panels of the terminal.

In step 940, the terminal may determine transmit power for each panel according to the received UL scheduling, and in step 945, the terminal may perform simultaneous UL transmission through multiple panels according to the determined value. The terminal may determine or allocate transmit power for each panel based on the configured TPC command.

Figure 10:
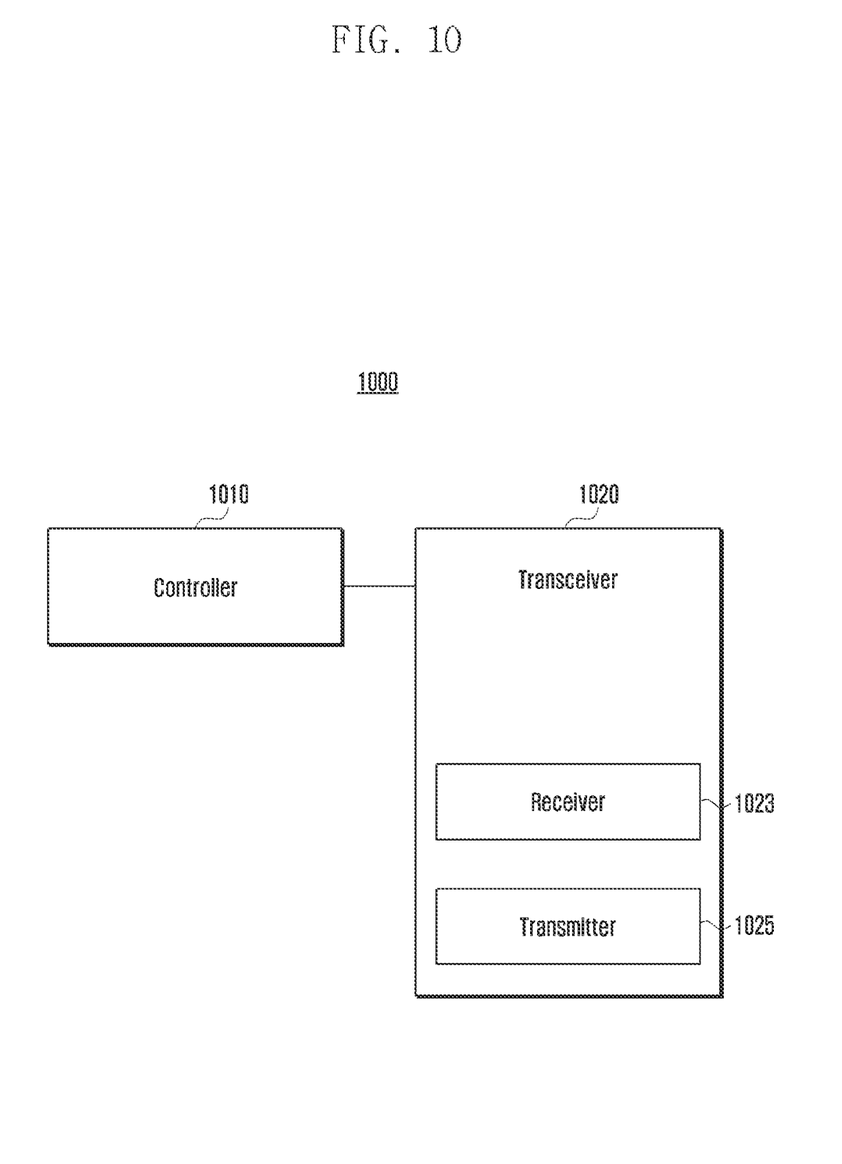
FIG. 10 illustrates the configuration of a terminal, according to an embodiment.

FIG. 10 illustrates the configuration of a terminal 1000, according to an embodiment.

Referring to FIG. 10, a terminal may include a transceiver 1020 and a controller 1010 configured to control overall operations of the terminal. In addition, the transceiver 1020 may include a transmitter 1025 and a receiver 1023.

The transceiver 1020 may transmit or receive a signal to or from other network entities.

The controller 1010 may control the terminal to perform operation in one of the above-described embodiments. The controller 1010 and the transceiver 1020 do not necessarily need to be implemented as separate modules, but may be implemented as a single element in the form of a single chip. The controller 1010 and the transceiver 1020 may be electrically connected. For example, the controller 1010 may be a circuit, an application-specific circuit, or at least one processor. Operations of the terminal may be realized by including a memory device, having a corresponding program code stored therein, in a random element in the terminal.

Figure 11:
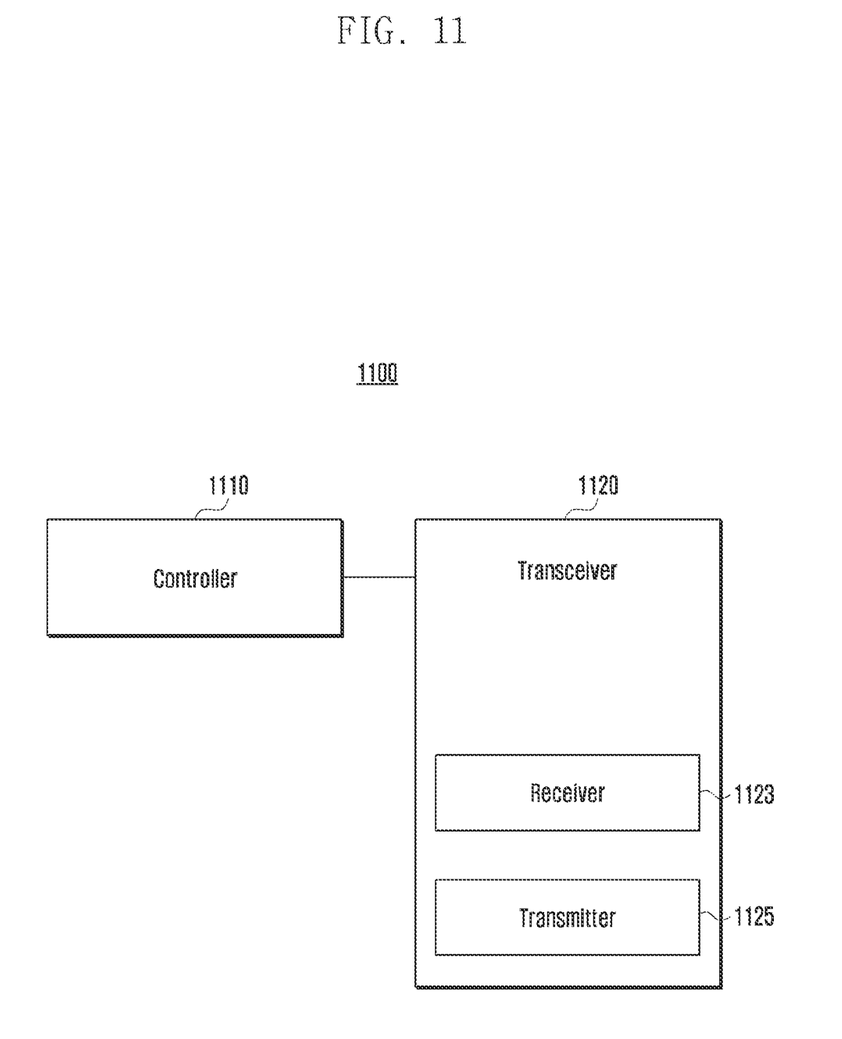
FIG. 11 illustrates the configuration of a base station, according to an embodiment.

FIG. 11 illustrates the configuration of a base station 1100, according to an embodiment.

Referring to FIG. 11, a base station may include a transceiver 1120 and a controller 1110 configured to control overall operations of the base station. The transceiver 1120 may include a transmitter 1125 and a receiver 1123.

The transceiver 1120 may transmit or receive a signal to or from the terminal.

The controller 1110 may control the base station to perform operation in one of the above-described embodiments. The controller 1110 and the transceiver 1120 do not necessarily need to be implemented as separate modules, but may be implemented as a single element in the form of a single chip. The controller 1110 and the transceiver 1120 may be electrically connected. For example, the controller 1110 may be a circuit, an application-specific circuit, or at least one processor. Operations of the base station may be realized by including a memory device, having a corresponding program code stored therein, in a random element in the base station.

It should be noted that the configuration diagrams illustrated in FIGS. 1 to 11, diagrams of control/data signal transmission methods, diagrams of operation procedures, and configuration diagrams are not intended to limit the scope of the disclosure. That is, all the elements, entities, or operation stages described in FIGS. 1 to 11 should not be construed as being essential elements for the implementation of the disclosure, and even if only some of the elements thereof are included, it can be implemented within a range that does not impair the essence of the disclosure.

The above-described operations of a base station or a terminal may be implemented by providing a memory device storing corresponding program codes in a bast station or terminal device. That is, a controller of the base station or terminal device may perform the above-described operations by reading and executing the program codes stored in the memory device by means of a processor or CPU.

Various units or modules of a network entity, a base station device, or a terminal device may be operated using hardware circuits such as complementary metal oxide semiconductor-based logic circuits, firmware, or hardware circuits such as combinations of software and/or hardware and firmware and/or software embedded in a machine-readable medium. For example, various electrical structures and methods may be implemented using transistors, logic gates, and electrical circuits such as application-specific integrated circuits.

While the disclosure has been described with reference to various embodiments, various changes may be made without departing from the spirit and the scope of the disclosure, which is defined, not by the detailed description and embodiments, but by the appended claims and their equivalents.

What is claimed is:

1. A method performed by a terminal in a wireless communication system, the method comprising:
    identifying a power headroom report (PHR) associated with multiple panels of the terminal;
    transmitting, to a base station, the PHR;
    receiving, from the base station, uplink (UL) scheduling information;
    determining transmit power values for the multiple panels based on the UL scheduling information; and
    performing a simultaneous UL transmission on the multiple panels based on the transmit power values,
    wherein the PHR indicates a difference between:
        a first expected UL received power of the base station that corresponds to a UL transmission on a single panel among the multiple panels, and
        a second expected UL received power of the base station that corresponds to the simultaneous UL transmission on the multiple panels.

2. The method of claim 1,
    wherein the PHR is determined based on a maximum transmit power for each of the multiple panels.

3. The method of claim 1, further comprising:
    receiving, from the base station, first configuration information to configure a type of PHR,
    wherein the first configuration information indicates a single PHR reporting for the multiple panels.

4. The method of claim 1, further comprising:
    receiving, from the base station, second configuration information indicating that the terminal reports the difference in the PHR.

5. The method of claim 1,
    wherein the UL scheduling information comprises information related to a transmit power control (TPC) command.

6. The method of claim 5,
    wherein the information related to the TPC command comprises a power value for determining the transmit power values for the multiple panels, and
    wherein the transmit power values for the multiple panels are autonomously determined by the terminal based on the power value.

7. A terminal in a wireless communication system, the terminal comprising:
    a transceiver; and
    a controller configured to:
    identify a power headroom report (PHR) associated with multiple panels of the terminal;
    transmit, to a base station via the transceiver, the PHR,
    receive, from the base station via the transceiver, uplink (UL) scheduling information,
    determine transmit power values for the multiple panels based on the UL scheduling information, and
    perform a simultaneous UL transmission on the multiple panels based on the transmit power values,
    wherein the PHR indicates a difference between:
        a first expected UL received power of the base station that corresponds to a UL transmission on a single panel among the multiple panels, and
        a second expected UL received power of the base station that corresponds to the simultaneous UL transmission on the multiple panels.

8. The terminal of claim 7,
    wherein the PHR is determined based on a maximum transmit power for each of the multiple panels.

9. The terminal of claim 7,
    wherein the controller is further configured to receive, from the base station via the transceiver, first configuration information to configure a type of PHR,
    and
    wherein the first configuration information indicates a single PHR reporting for the multiple panels.

10. The terminal of claim 7,
    wherein the controller is further configured to receive, from the base station via the transceiver, second configuration information indicating that the terminal reports the difference in the PHR.

11. The terminal of claim 7,
    wherein the UL scheduling information comprises information related to a transmit power control (TPC) command,
    wherein the information related to the TPC command comprises a power value for determining the transmit power values for the multiple panels, and
    wherein the transmit power values for the multiple panels are autonomously determined by the terminal based on the power value.

12. A method performed by a base station in a wireless communication system, the method comprising:
    receiving, from a terminal, a power headroom report (PHR) associated with multiple panels of the terminal;
    determining uplink (UL) scheduling information based on the PHR;

transmitting, to the terminal, the UL scheduling information; and receiving, from the terminal, a simultaneous UL transmission on the multiple panels based on a transmit power values, wherein the PHR indicates a difference between:
- a first expected UL received power of the base station that corresponds to a UL transmission on a single panel among the multiple panels, and
- a second expected UL received power of the base station that corresponds to the simultaneous UL transmission on the multiple panels.

13. The method of claim 12, further comprising:

transmitting, to the terminal, first configuration information to configure a type of PHR, wherein the first configuration information indicates a single PHR reporting for the multiple panels.

14. The method of claim 12, further comprising:

transmitting, to the terminal, second configuration information indicating that the terminal reports the difference in the PHR.

15. The method of claim 12, wherein the UL scheduling information comprises information related to a transmit power control (TPC) command, wherein the information related to the TPC command comprises a power value for determining the transmit power values for the multiple panels, and wherein the transmit power values for the multiple panels are autonomously determined by the terminal based on the power value.

16. A base station in a wireless communication system, the base station comprising:

a transceiver; and a controller configured to:
- receive, from a terminal via the transceiver, a power headroom report (PHR) associated with multiple panels of the terminal,
- determine uplink (UL) scheduling information based on the PHR,
- transmit, to the terminal via the transceiver, the UL scheduling information, and
- receive, from the terminal via the transceiver, a simultaneous UL transmission on the multiple panels based on a transmit power values, wherein the PHR indicates a difference between:
- a first expected UL received power of the base station that corresponds to a UL transmission on a single panel among the multiple panels, and
- a second expected UL received power of the base station that corresponds to the simultaneous UL transmission on the multiple panels.

17. The base station of claim 16, wherein the controller is further configured to transmit, to the terminal via the transceiver, first configuration information to configure a type of PHR, and wherein the first configuration information indicates a single PHR reporting for the multiple panels.

* * * * *